United States Patent [19]

Peele

[11] Patent Number: 4,604,647

[45] Date of Patent: Aug. 5, 1986

[54] CATHODE RAY TUBE DRIVER CIRCUIT

[75] Inventor: James C. Peele, Portsmouth, Va.

[73] Assignee: General Electric Company, Portsmouth, Va.

[21] Appl. No.: 663,628

[22] Filed: Oct. 22, 1984

[51] Int. Cl.⁴ .................... H04N 9/20; H04N 9/64; H04N 9/16; H04N 5/68

[52] U.S. Cl. .................... 358/65; 358/29; 358/74; 358/242

[58] Field of Search ............ 358/65, 29, 243, 64, 358/74, 242

[56] References Cited

U.S. PATENT DOCUMENTS

| | | | |
|---|---|---|---|
| 2,952,736 | 9/1960 | Larky et al. | 358/29 |
| 3,334,180 | 8/1967 | Loughlin | 178/7.5 |
| 3,465,095 | 9/1969 | Hansen et al. | 358/243 |
| 3,967,314 | 6/1976 | Anglin | 358/29 |
| 4,053,927 | 10/1977 | Schmidtmann | 358/65 |
| 4,130,829 | 12/1978 | Kam et al. | 358/65 |
| 4,139,861 | 2/1979 | Anglin | 358/29 |
| 4,233,624 | 11/1984 | Hinn et al. | 358/65 |
| 4,300,074 | 11/1981 | Diddens et al. | 315/401 |
| 4,438,366 | 3/1984 | Kamata | 315/1 |

OTHER PUBLICATIONS

*Basic Television and Video Systems,* by B. Grob, 5th edition, McGraw-Hill, 1984, pp. 116-117 and 177.

Primary Examiner—Michael A. Masinick
Assistant Examiner—R. Bauer

[57] ABSTRACT

A driver circuit for a CRT is disclosed wherein opposite polarity control signals are derived from a single video color signal and are applied to the cathode and grid of an electron gun of the CRT to control beam current and consequently the light output of the image generated by the gun on the screen of the tube.

18 Claims, 9 Drawing Figures

CATHODE RAY TUBE DRIVER CIRCUIT

The present invention relates in general to cathode ray tube (CRT) driver circuits and in particular to a driver circuit which derives opposite polarity control signals from a single video signal for application to the cathode and grid electrodes of an electron gun of the cathode ray tube.

BACKGROUND OF THE INVENTION

Cathode ray tubes are widely used in display apparatus, such as television receivers, for displaying an image. In order to generate the image, a potential difference must be developed between the cathode and grid electrodes of the CRT to stimulate the emission of an electron beam from the cathode. When the potential difference is varied as a function of a video signal, the intensity of the electron beam varies accordingly and an image representative of the video signal is developed on the CRT screen.

In color television receivers, two types of driver circuits are generally used to develop the cathode-grid potential difference, both described in *Basic Television and Video Systems* by B. Grob, 5th edition, McGraw-Hill, 1984, p. 117-118 and 177. These two types of circuits use the R, G and B (red, green and blue) signal components of the incoming television signal, and the Y signal component (luminance signal) in different ways. In the first type of circuit, control signals representative of R−Y, G−Y and B−Y color difference signals are applied to three separate CRT control grids and a control signal representative of the −Y signal is applied to the three CRT cathodes. The CRT acts as a mixer to provide potential differences between respective cathode and grid electrode pairs, the potential differences varying as a function of the R, G and B video signals respectively. This driving arrangement has the disadvantage of establishing a grid electrode with a high negative potential, which too frequently results in an arcing problem within the CRT envelope.

In the second type of driving circuit a matrix circuit is used to remove the Y component from the color difference signals. Control signals representative of the resulting R, G and B video signals are applied to the respective CRT cathodes, while the grid of each electrode pair is grounded to produce the required potential difference. This single-ended type of driving circuit has the inherent disadvantage of requiring high voltage control signals to drive the cathode.

It is well known to those skilled in the art that the selection of amplifier circuit components normally requires a trade-off between voltage capacity and frequency response, the tradeoff being necessitated by inherent limitations in the amplifying devices. Particularly when it is desired to use semiconductor amplifiers in high frequency applications, such as video amplifiers, the tradeoff often makes it difficult to select circuit components which are capable of developing the required drive voltages at video frequencies.

The frequency response problem inherent in using semiconductor amplifiers in high voltage CRT cathode driver circuits has been recognized, as shown in U.S. Pat. No. 4,233,624 to Hinn et al. The Hinn patent addresses the problem through the use of a filter circuit to detect high frequency video signal components, compensating and combining circuits to remove the high frequency video components from the cathode driver circuits, and amplifier circuits to apply those components to the grid. Hinn's CRT driver circuit, however, requires a high voltage, high frequency amplifier in the grid driver circuit and is thus subject to the disadvantages attending such an arrangement. Further, Hinn's circuit requires complex filtering and combining circuitry.

OBJECTS OF THE INVENTION

It is a principal object of the present invention to provide new and improved apparatus for driving a CRT which is not subject to many of the aforementioned problems and disadvantages.

Another object of the present invention is to provide a semiconductor CRT driver circuit which has lower voltage rating requirements for its active semiconductors than heretofore available driver circuits.

A further object of the present invention is to provide a semiconductor CRT driver circuit which permits the use of relatively high frequency response range amplifiers.

Another object of the invention is to provide a CRT driver circuit which decreases the likelihood of internal arcing of the CRT grid electrodes.

Yet another object of the present invention is to provide a CRT driver circuit which allows the use of active semiconductor devices having low voltage ratings and high frequency response capabilities.

Another object of the present invention is to provide a high frequency CRT driver circuit which allows the use of relatively inexpensive, more easily fabricated semiconductor amplifier devices.

SUMMARY OF THE INVENTION

The foregoing objects of the invention are achieved through the use of a new and improved CRT driver circuit wherein separate circuit portions develop opposite polarity control signals, each control signal varying in amplitude as a function of a single video signal. The control signals so developed are applied to the cathode and grid electrodes of an electron gun in a CRT. As applied to a television receiver system adapted to process a received television signal to provide a video signal to a CRT driver circuit, the invention includes video amplifier circuitry for providing positive and negative control signals, each of which varies in accordance with a common video signal. Upon application of the control signals to the CRT cathode and grid, a potential difference is developed between these two electrodes which varies as a function of the video signal to control the image on the CRT screen. With the present invention, the voltages required to drive the cathode and grid electrodes respectively are relatively low and, significantly, relatively inexpensive, low-power semiconductor amplifiers having good high frequency response characteristics can be used.

These and other objects of the invention, as well as the features and advantages thereof, will become apparent from the following detailed description when read in conjunction with the accompanying drawings, in which applicable reference numerals have been carried forward.

DETAILED DESCRIPTION OF THE DRAWINGS

Figure 1:
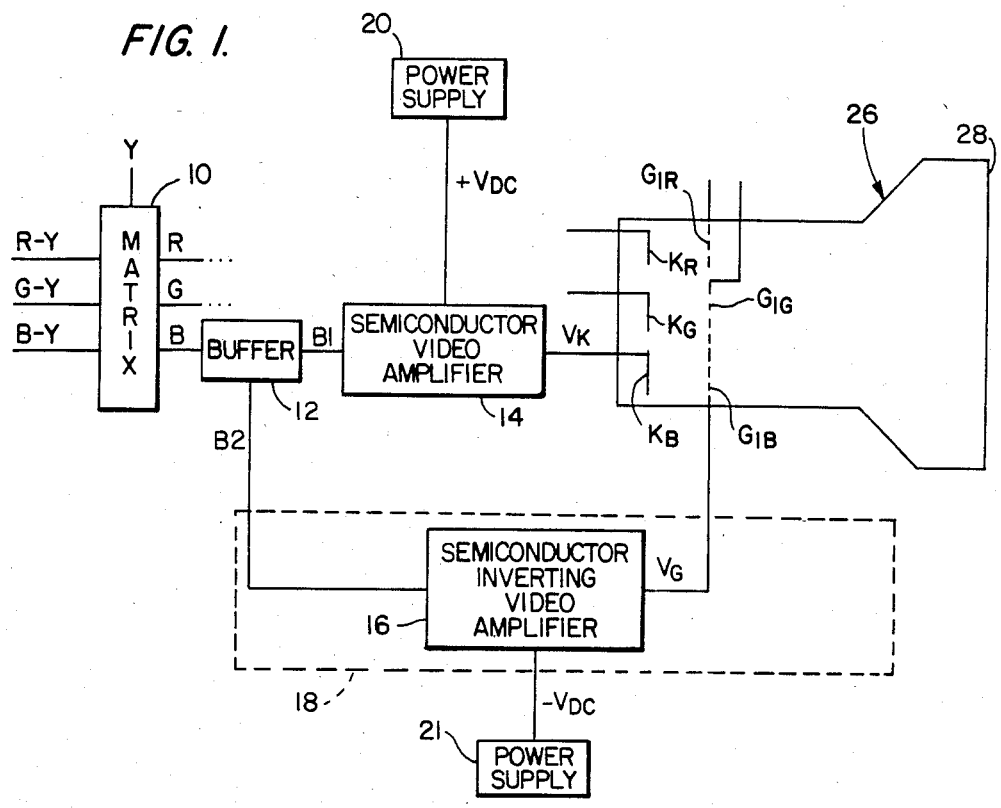
FIG. 1 is a diagrammatic view of a preferred embodiment of the invention as implemented in a color television receiver.

FIG. 1 shows color difference signals R−Y, G−Y and B−Y, obtained by processing a standard television signal in a manner well known to those skilled in the art. A matrix circuit 10 is used to additively remove luminance signal Y from the color difference signals, resulting in video color signals R, G and B at the outputs of the matrix. A buffer 12 is connected at its input to the B signal output of matrix 10. Buffer 12 has a first output which applies a signal B1 to the input of a semiconductor video amplifier 14, and a second output which applies a signal B2 to a semiconductor inverting video amplifier 16. The output of amplifier 14 is connected to a cathode $K_B$ of a cathode ray tube 26 and applies a signal $V_K$ thereto. The output of inverting amplifier 16 is connected to a control grid $G_{1B}$ of CRT 26 and applies a signal $V_G$ thereto. Cathode $K_B$ and grid $G_{1B}$ jointly control the current of a developed electron beam which is directed through a shadow mask (not shown) in the tube and strikes blue light emitting phosphors on the inside of the face of the tube.

A DC power supply 20 is shown connected to amplifier 14 and a DC power supply 21 is connected to inverting amplifier 16. Although shown as separate power supplies for explanatory purposes, units 20 and 21 may constitute a single power supply from which positive and negative DC voltages $+V_{DC}$ and $-V_{DC}$ are derived for application to the respective amplifiers.

Figure 2:
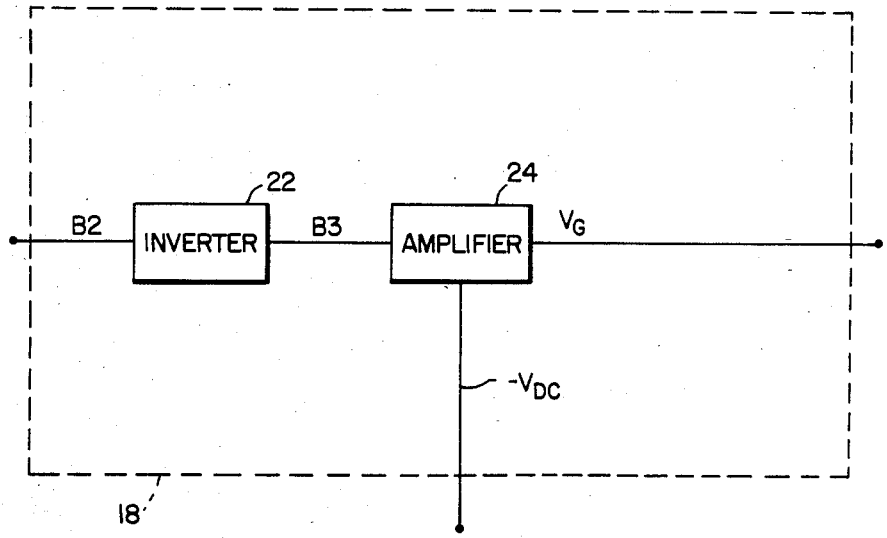
FIG. 2 illustrates an alternate embodiment of one of the driver circuits of FIG. 1.

FIG. 2 shows an alternate embodiment of a grid driving circuit 18, wherein the second output of buffer 12 is connected to separate inverter 22. A signal B3 is applied by the inverter to an amplifier 24 which may be substantially identical to amplifier 14. Amplifier 24 is connected between the output of inverter 22 and blue control grid $G_{1B}$ so as to apply signal $V_G$ to the latter.

It will be understood that apparatus substantially identical to that shown in FIGS. 1 or 2 may be connected between the R and G outputs of matrix 10 and the respective red and green CRT cathode and grid electrode pairs $K_R$, $G_{1R}$ and $K_G$, $G_{1G}$. Such apparatus has been omitted from FIG. 1 for purposes of clarity.

The potential difference applied to each electrode pair must remain within a predetermined range of magnitude, i.e. between a black image level and a bright image level, for proper control of the intensity of the image on the screen of the CRT. Thus, in operation, the circuit which constitutes the subject matter of the present invention will develop a potential difference between each CRT electrode pair which remains within the aforesaid predetermined magnitude range. The potential difference between cathode $K_B$ and grid $G_{1B}$ will vary as a function of blue video signal B. Similarly, the potential difference between the other electrode pairs will vary as a function of video signals G and R respectively.

Figure 3A:
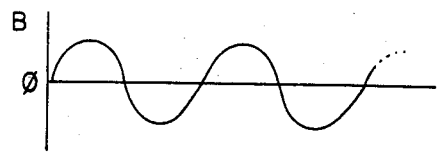
FIGS. 3a-3g illustrate amplitude, polarity and phase relationships between certain signals developed by the apparatus of FIGS. 1 and 2.
Figure 3B:
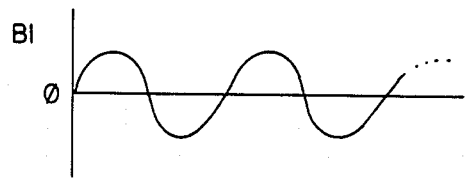
Figure 3C:
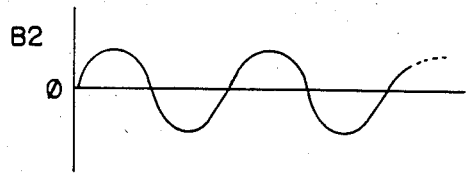

As explained in connection with FIG. 1, buffer 12 is used to provide two input signals B1 and B2, in response to blue video signal B. As shown in FIGS. 3a, 3b and 3c, signals B1 and B2 are identical in phase to signal B and vary as a linear function of signal B. Depending on the type of buffer used, signals B1 and B2 can differ in amplitude with respect to signal B or with respect to each other.

Figure 3D:
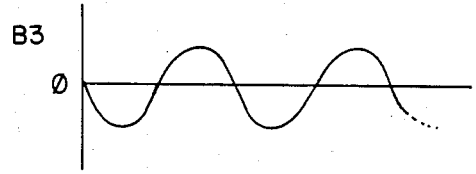
Figure 3E:
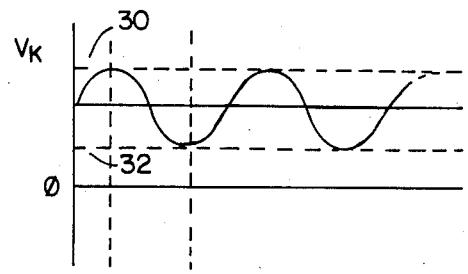
Figure 3F:
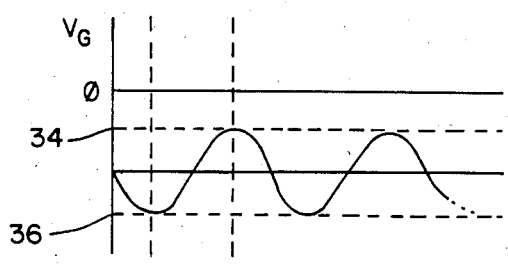

Amplifier 14 amplifies and DC level-shifts input signal B1 to provide a first control signal $V_K$ at its output. As illustrated in FIG. 3e, the voltage of signal $V_K$ varies within a pair of predetermined amplitude limits 30 and 32, both positive in polarity. Inverting amplifier 16, which receives signal B2 as an input, amplifies, inverts and DC level-shifts the latter signal to provide a second control signal $V_G$ at its output. As shown in FIG. 3f, signal $V_G$ varies within a pair of predetermined negative voltage limits 34 and 36.

In the alternative embodiment shown in FIG. 2, amplifier 16 is replaced with a separate inverter circuit 22 and an amplifier circuit 24. In operation, inverter 22 inverts input signal B2 so as to apply signal B3, depicted in FIG. 3d, to amplifier 24. The latter amplifier operates substantially identically to amplifier 14 described above and provides signal $V_G$, shown in FIG. 3f, at its output.

Figure 3G:
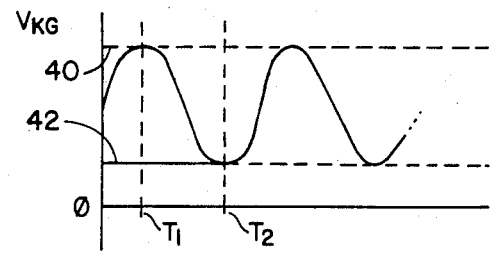

In both of the embodiments of the invention depicted in FIGS. 1 and 2, signal $V_K$ is applied to cathode $K_B$, while signal $V_G$ is applied to grid $G_{1B}$. Thus, the potential difference $V_{KG}$ developed between the cathode and grid electrodes will vary as a function of video signal B. Further, since control signals $V_K$ and $V_G$ vary between predetermined limits, potential difference $V_{KG}$ is maintained within the predetermined magnitude range prescribed for the cathode ray tube. This is illustrated in FIG. 3g. At time T1, $V_K$ is at maximum positive voltage limit 30, $V_G$ is at maximum negative voltage limit 32, and potential difference $V_{KG}$ is at its upper positive voltage level 40. At time T2, $V_G$ is at miminum negative voltage limit 34, $V_K$ is at minimum positive voltage limit 32, and $V_{KG}$ is at its lower positive voltage level 42. $V_{KG}$ therefore varies between predetermined levels 40 and 42, and thus is maintained within a predetermined magnitude range.

By way of example and without limitation, limits 30 and 32 may be selected as +75 and +20 volts respectively, and limits 36 and 34 may be selected as −75 and −20 volts respectively. Thus, magnitude levels 42 and 40 will be +40 and +150 volts respectively, a range selected to drive certain standard, commercially available color CRTs.

In accordance with the parameters selected for a preferred embodiment of the invention, amplifiers 14 and 16 have substantially linear characteristics and substantially the same gain. Input signals B1 and B2 are substantially equal in amplitude in this embodiment. It will be obvious to those skilled in the art that under these conditions control signals $V_K$ and $V_G$ are substantially equal in amplitude, opposite in polarity, and inverted with respect to each other, i.e. they are 180° out of phase. Such an arrangement yields significant advantages in the operation of the circuit, as well as in the selection of the circuit components. One advantage is that signals $V_K$ and $V_G$ each need to develop only one half the driving voltage, as compared to the driving voltage required in a single-ended, prior art driving circuit. As a consequence, components capable of operating at lower voltages may be utilized in the amplifier circuitry and the tradeoff of frequency response versus voltage capacity, discussed above, will no longer be as limiting a factor. Also, a power supply may be selected which provides two relatively low, equal and opposite polarity DC supply voltages to amplifiers 14 and 16, instead of a single, higher voltage required by the single-ended driver circuit. Finally, the relatively low voltage of signal $V_G$ applied to grid $G_{1B}$ will serve to reduce the internal CRT arcing problems described above.

Under certain conditions it may be desirable to alter the circuit characteristics of the present invention to meet specific operating requirements, or to obtain other advantages. For example, the amplitude of signal $V_K$ may be increased and the amplitude of $V_G$ proportionately decreased to minimize CRT arcing. Further, in applications where it is desirable to compensate for nonlinearities in the operating characteristics of the CRT or related circuitry, amplifiers with specific nonlinear amplifying characteristics may be used.

The selection of components for the various circuit portions will determine the operating characteristics of the driver circuit which forms the subject matter of the present invention. For example, the selection of the amplifier components, in combination with the power supply and buffer components, will serve to determine the DC level of the control signals, as well as to maintain the control signals within their predetermined amplitude limits. The selection of components will also determine the operating characteristics, including the linearity, of the amplifier circuits.

While a preferred embodiment of the invention has been illustrated and described, it will be obvious to those skilled in the art that the invention is not so limited. For example, in addition to its use in a television receiver (black and white or color), the invention may be utilized in computer monitors or the like and generally in oscilloscope display applications. Further, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. A circuit for driving a cathode ray tube in response to a video signal, said driving circuit comprising:
    a first circuit portion responsive to said video signal for providing a first control signal to a first electrode of an electron gun, of said tube, said first control signal having a first polarity and being adapted to vary in amplitude between predetermined first limits; and
    a second circuit portion responsive to said video signal for providing a second control signal to a second electrode of said electron gun, said second control signal being inverted and of opposite polarity with respect to said first control signal and being adapted to vary in amplitude between predetermined second limits;
    whereby the potential difference between said first and second electrodes varies within a predetermined range of magnitude as a function of said video signal to control the gun current and consequently the light image formed on the screen of said tube.

2. The driving circuit of claim 1 wherein said first and second electrodes comprise a cathode and a grid respectively of said electron gun;
    said first circuit portion including means for providing a control signal of positive polarity to said cathode; and
    said second circuit portion including means for inverting the signal applied thereto, and means responsive to said inverted signal for providing a control signal of negative polarity to said grid.

3. The driving circuit of claim 2 wherein each of said first and second circuit portions comprises a semiconductor video amplifier having a gain greater than unity.

4. The driving circuit of claim 3 and further including a buffer preceding said first and second circuit portions, said buffer being responsive to said video signal for providing first and second input signals to said first and second circuit portions respectively.

5. The driving circuit of claim 4 wherein said first and second input signals are equal in amplitude; and
    wherein said first and second video amplifiers have linear operating characteristics and identical gains to provide said first and second control signals of equal magnitude.

6. The driving circuit of claim 3 and further including means for deriving first and second DC power supply voltages of positive and negative polarity respectively; and
    means for applying said first and second power supply voltages to said first and second video amplifiers respectively.

7. The driving circuit of claim 6 wherein said applied first and second power supply voltages are equal, in magnitude.

8. In a television receiver wherein a video signal is derived from the incoming signal for application to a cathode ray tube, said tube including an electron gun having a cathode and at least one grid and being responsive to the applied difference in potential therebetween within a predetermined magnitude range for controlling the intensity of an image on the screen of said tube;
    a driving circuit for said cathode ray tube comprising:
    a first circuit portion for providing a first control signal of a first polarity in response to said video signal, said first control signal being adapted to vary in amplitude within predetermined first amplitude limits;
    a second circuit portion for providing a second control signal in response to said video signal, said second control signal being inverted and of opposite polarity with respect to said first control signal and being adapted to vary within predetermined second amplitude limits; and
    means for applying the positive and negative ones of said control signals to said cathode and grid respectively to develop a potential difference therebetween within said predetermined magnitude range.

9. A television receiver in accordance with claim 8 wherein said second circuit portion includes means for inverting the signal applied thereto, said second control signal being responsive to said inverted signal.

10. A television receiver in accordance with claim 8 wherein each of said first and second circuit portions comprises an active semiconductor video amplifier having a gain greater than unity.

11. A television receiver in accordance with claim 10 and further comprising buffer means preceding said first and second circuit portions, said buffer means being responsive to said video signal for providing separate input signals to said first and second circuit portions respectively.

12. A television receiver in accordance with claim 11 wherein said separate input signals are substantially equal in amplitude.

13. A television receiver in accordance with claim 12 wherein said video amplifiers have substantially the same gain such that said first and second control signals have substantially identical amplitudes.

14. A television receiver in accordance with claim 10 wherein said first and second control signals have positive and negative polarities respectively, and further including:
   means for deriving positive and negative DC power supply voltages; and
   means for supplying said positive and negative power supply voltages to said first and second video amplifiers respectively.

15. A television receiver in accordance with claim 14 wherein said positive and negative power supply voltages are substantially equal in amplitude.

16. A television receiver in accordance with claim 14 wherein said receiver is adapted to process a television signal to derive at least red, green and blue video signals respectively;
   said cathode ray tube further including second and third electron guns, each gun having a cathode and grid electrode pair, each pair having a separate driving circuit associated therewith, and each of said driving circuits being responsive to one of said video signals to control the intensity of the corresponding color in said image.

17. In a television receiver wherein an incoming television signal is processed to derive a video signal:
   a cathode ray tube including at least one cathode and at least one grid, said tube being responsive to an applied difference in potential between said cathode and grid within predetermined positive levels of voltage for controlling the intensity of an image on the screen of said tube;
   a first amplifier circuit including a first active semiconductor video amplifier, said first amplifier circuit being responsive to said video signal for providing a first control signal, said first control signal having a positive polarity and being adapted to vary within predetermined first and second amplitude limits as a substantially linear function of said video signal;
   a second amplifier circuit including a second active semiconductor video amplifier, said second amplifier circuit being responsive to said video signal for providing a second control signal, said second control signal being inverted with respect to said first control signal and of negative polarity and being adapted to vary within predetermined third and fourth amplitude limits;
   said first and second amplitude limits being equal in magnitude to said third and fourth amplitude limits respectively;
   said first amplifier circuit further including means for providing a positive DC power supply voltage to said first video amplifier;
   said second amplifier circuit further including means for providing a negative DC power supply voltage to said second video amplifier, said DC power supply voltages being substantially equal in absolute magnitude; and
   means for applying said first control signal to said cathode and said second control signal to said grid for developing a potential difference therebetween which falls within said predetermined voltage levels.

18. A television receiver in accordance with claim 17 wherein said receiver is adapted to process a color television signal for deriving at least red, green and blue video signals;
   said cathode ray tube including at least three cathode and grid electrode pairs each having a separate pair of first and second amplifier circuits associated therewith, and each of said amplifier circuit pairs being responsive to one of said red, green and blue video signals to control the intensity of the corresponding color in said image.

* * * * *